US010708416B2

(12) United States Patent
Dutkevič et al.

(10) Patent No.: US 10,708,416 B2
(45) Date of Patent: Jul. 7, 2020

(54) IDENTIFYING SPAM CALLERS IN CALL RECORDS

(71) Applicant: Avast Software s.r.o., Prague (CZ)

(72) Inventors: Jiří Dutkevič, Prague (CZ); Martin Horváth, Psáry-Dolní Jirčny (CZ); Juraj Chrappa, Prague (CZ); Vojtech Tůma, Brtnice (CZ)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 15/937,369

(22) Filed: Mar. 27, 2018

(65) Prior Publication Data
US 2018/0288221 A1 Oct. 4, 2018

Related U.S. Application Data

(60) Provisional application No. 62/477,572, filed on Mar. 28, 2017.

(51) Int. Cl.
*H04M 3/22* (2006.01)
*H04M 3/436* (2006.01)
*H04L 29/06* (2006.01)
*H04W 12/12* (2009.01)

(52) U.S. Cl.
CPC ...... *H04M 3/2281* (2013.01); *H04L 63/1408* (2013.01); *H04L 63/1441* (2013.01); *H04M 3/436* (2013.01); *H04M 2203/551* (2013.01); *H04M 2203/556* (2013.01); *H04W 12/12* (2013.01)

(58) Field of Classification Search
CPC .............. H04M 3/2281; H04M 3/436; H04M 3/42059; H04L 51/12; H04L 51/38; H04L 63/1441
See application file for complete search history.

(56) References Cited

U.S. PATENT DOCUMENTS

| 7,613,286 | B2 | 11/2009 | Hong |
| 8,687,782 | B1 * | 4/2014 | Ismail ................ G06Q 30/0247 379/112.01 |
| 9,106,739 | B1 | 8/2015 | Devitt et al. |

(Continued)

FOREIGN PATENT DOCUMENTS

| WO | 2011149846 A1 | 12/2011 |
| WO | 2015189380 A1 | 12/2015 |

OTHER PUBLICATIONS

Keith Andere, Truecaller! How it works and what you need to know about it, Jun. 3, 2015, 6 pages, https://www.linkedin.com/pulse/truecaller-how-works-what-you-need-know-keith-andere. Accessed Jun. 26, 2018.

(Continued)

*Primary Examiner* — Ernest G Tacsik
(74) *Attorney, Agent, or Firm* — Erickson Kernell IP, LLC

(57) ABSTRACT

Phone numbers can be identified as being associated with spam callers. Data associated with previously identified spammer phone numbers is analyzed to obtain one or more input parameters for a classification engine. The classification engine uses the input parameters to identify one or more phone numbers in data associated with currently active phone numbers as being associated with spam callers. The one or more phone numbers identified as being associated with spam callers can be provided to call blockers of end-user telephone devices.

20 Claims, 4 Drawing Sheets

(56) References Cited

U.S. PATENT DOCUMENTS

| | | | | |
|---|---|---|---|---|
| 9,491,288 B1* | 11/2016 | Belford | | H04W 4/16 |
| 2007/0283006 A1* | 12/2007 | Hong | | H04M 3/436 |
| | | | | 709/224 |
| 2008/0084982 A1* | 4/2008 | Chatterjee | | H04M 3/42008 |
| | | | | 379/201.01 |
| 2010/0124916 A1 | 5/2010 | Kim et al. | | |
| 2013/0151605 A1* | 6/2013 | Papakipos | | G06Q 10/10 |
| | | | | 709/204 |
| 2014/0004892 A1* | 1/2014 | Murynets | | H04W 4/14 |
| | | | | 455/466 |
| 2015/0156300 A1* | 6/2015 | Park | | H04M 1/663 |
| | | | | 455/414.1 |

OTHER PUBLICATIONS

Waseem Ashraf, Truecaller is a privacy risk—how it works is what you might not like, Oct. 18, 2015, 3 pages, https://web.archive.org/web/20160129153714/https://www.ethow.com/2015/10/how-Truecaller-works-is-what-you-might-not-like.html. Accessed Jun. 26, 2018.

Nomorobo, 8 pages, https://web.archive.org/web/20170326133731/https://nomorobo.com/. Accessed Jun. 26, 2018.

Hiya Security—We Provide a Better Phone Experience, 3 pages, https://web.archive.org/web/20170403110925/https://hiya.com/privacy. Accessed Jun. 26, 2018.

Callblock—Adblock for Unwanted Calls, 9 pages, https://web.archive.org/web/20161015011025/https://callblockapp.com. Accessed Jun. 26, 2018.

ooma—Call blocking FAQ, 5 pages, https://web.archive.org/web/20170109182612/http://support.ooma.com/home/call-blocking-meta-article. Accessed Jun. 26, 2018.

* cited by examiner

IDENTIFYING SPAM CALLERS IN CALL RECORDS

CROSS-REFERENCE TO RELATED APPLICATIONS

This Application claims priority to U.S. Provisional Patent Application Ser. No. 62/477,572, filed on Mar. 28, 2017, entitled "Identifying Spam Callers in Call Records," the entire disclosure of which is incorporated herein by reference.

FIELD

The disclosure relates generally to mobile telephones, and more particularly, to identifying spam callers in call records.

BACKGROUND

Since their introduction, the use of mobile telephones has grown to the point where mobile telephones are almost ubiquitous. In many cases, users have replaced traditional landline telephones with mobile telephones. One problem associated with mobile phones is the "spam" call. A spam call is typically thought of as an unwanted phone call, for example, from a telemarketer, from a perpetrator of a scam, from an automated dialer etc. Spam calls can be problematic for a number of reasons. They can interrupt the mobile phone user, they can use air time paid for by the user, they can result in the user being the victim of a fraudulent scheme, and can waste the mobile phone user's time and money.

BRIEF DESCRIPTION OF THE DRAWINGS

For a better understanding of the inventive subject matter, reference may be made to the accompanying drawings in which.

DETAILED DESCRIPTION

Figure 1:
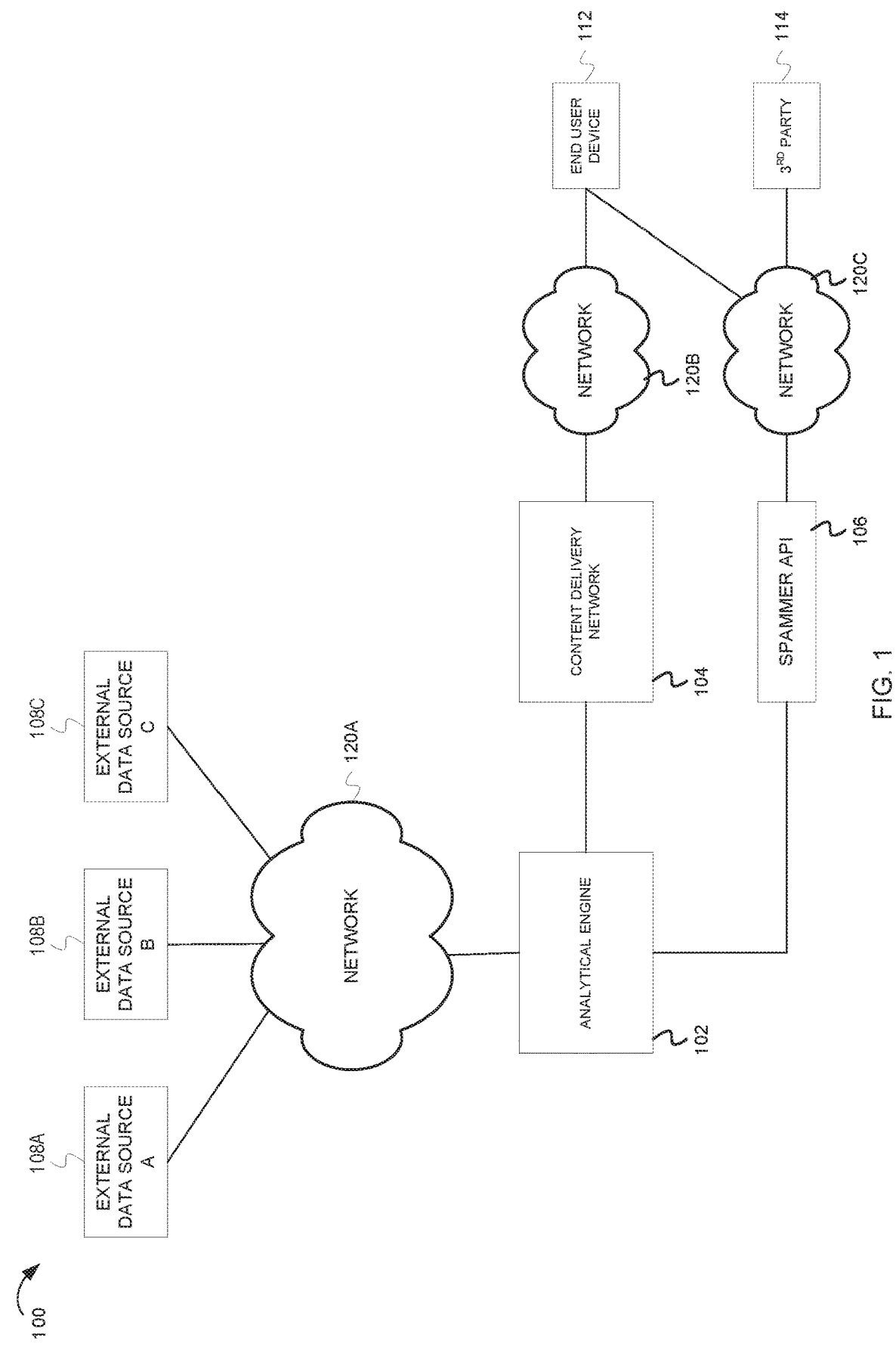
FIG. 1 is a block diagram of a system according to embodiments.

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as examples only and does not describe every possible instance of the inventive subject matter. Numerous alternatives could be implemented, using combinations of current or future technologies, which would still fall within the scope of the claims. For example, the description below refers to mobile telephones in certain examples. It should be noted that the systems and methods described herein can be applied to telephony systems associated with other telephone types as well, such as VoIP (Voice of IP) and landline phone systems. The following detailed description is, therefore, not to be taken in a limiting sense, and the scope of the inventive subject matter is defined only by the appended claims.

FIG. 1 is a block diagram of a system 100 to identify spam callers according to embodiments. In some aspects, system 100 includes an analytical engine 102, a content delivery network (CDN) 104, and a spammer application program interface (API) 106. The system may be communicably coupled to external data sources 108, end user device 112, and/or a third party 114 via one or more networks 120. Networks 120 may be one or more wireless networks, wired networks, or combinations of wired and wireless network. In some embodiments, network 120 can be the Internet. Three networks 120A, 120B and 120C are shown in FIG. 1. Those of skill in the art will appreciate that there may be more or fewer networks in the system. For example, networks 120A, 120B and 120C could be the same network (e.g., the Internet).

Analytical engine 102 can be a server system, or component of a server system that analyzes call data to identify spam callers. Analytical engine 102 uses the components and methods described herein to receive call data, call metadata, and determine potential spam callers based on analysis of the call data and call metadata. The results of the analysis can be pushed to end user devices via a network such as CDN 104.

CDN 104 can be a network of servers that are located at different geographic locations. The content delivery network, when utilized, can be used to transmit data regarding phone numbers that have been identified as potential spam callers to end user device 112. In some aspects, an end user device 112 can receive data from a CDN 104 server that is geographically close (in physical location or in network topology) to the end user device 112.

Spammer application program interface (API) 106 provides a software interface to the analytical engine. The API can provide functions that provide a means for supplying data about a phone number or numbers and functions for acquiring data regarding a phone number or numbers. Thus, the functions provide a means for a third party 114 to communicate data or metadata regarding phone calls. For example, a third party system that maintains a database of spam callers can supply data from its database to the analytical engine 102, thereby allowing the analytical engine to incorporate and utilize the third party data in its analysis. Similarly, a third party can query the analytical engine to receive a spammer score associated with a phone number. The system can thus provide a means for third parties to serve as a data provider to the system and to consume data from the system.

External data sources 108 comprise systems that can supply phone number data and metadata regarding phone numbers, and locations based on phone numbers. For example, an external data source 108A can be a system or database maintained by the U.S. Federal Communications Commission (FCC). External data source 108B can be a GOOGLE® maps API that provides location data. External data source 108C can be another public or private system that can provide call data, metadata or other data useful to analytical engine 102.

End user device 112 can be a smartphone, tablet device or other device that is capable of originating and/or receiving telephone calls. In some embodiments, the end user device 112 may execute a version of the ANDROID® operating system. In alternative embodiments, the end user device 112 may execute a different operating system such as the iOS® operating system.

Figure 2:
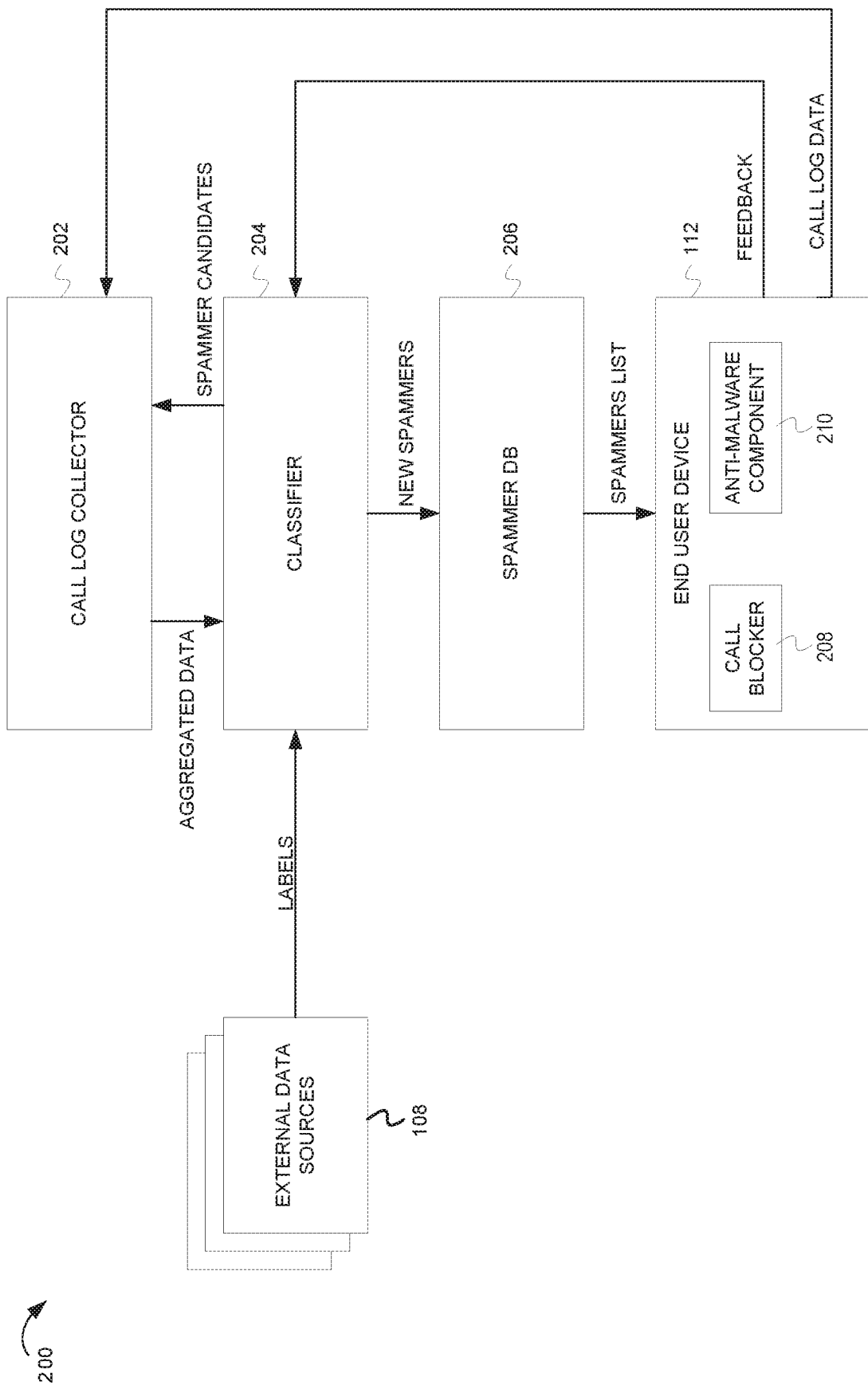
FIG. 2 is a diagram illustrating a data flow between various components of a system according to embodiments.

FIG. 2 is a diagram 200 illustrating a data flow between various components of a system according to embodiments. For the example embodiments represented in FIG. 2, the call log collector 202, classifier 204, and spammer database 206 can be components of the analytical engine 102 (FIG. 1).

In some embodiments, an anti-malware component 210 on an end user device 112 can provide call logs that are maintained by a call log collector 202. For example, an anti-malware component 210 can collect call log data locally on end user device 112, and forward the call log data to call log collector 202. In some aspects, the call log data can include the duration of a call, a phone number of the originator of the call, and a time when the call was made. The call log data can be anonymized by excluding the phone number of the actual user who sends the data, and supplying a machine-generated anonymous identifier to replace the phone number. Thus, the classifier can have the capability to compute how many unique end users were contacted by a given spammer, while making it extremely difficult or impossible to identify individual end users.

Call log collector 202 can collect the call log data from potentially many end user devices 112, and aggregate the data. The call log data typically contains one or more rows of data for each phone call sent or received by a mobile device. The data in the call logs can be aggregated by phone number such that summary statistics can be maintained for a particular phone number over some period of time. For example, the system can aggregate the data in the call logs such that a single record exists that includes the total number of calls and other summary data about the phone number over the time period represented by the call log. The aggregated data can be passed to classifier 204.

Classifier 204 can obtain phone number data and metadata from external sources 108. As noted above, such external data sources can include the U.S. Federal Communications Commission (FCC), GOOGLE® maps data, and other phone number data and/or metadata, and location information. The data from external data sources 108 can include labels that describe the phone numbers. For example, the labels can identify numbers (active in the past) that have actually been determined as being used by spammers. Classifier 204 can apply various heuristics and methods to analyze the aggregated data from the call log collector 202, the labels, and other data from external data sources 108 to determine numbers in the aggregated data that may be associated with spam callers. For example, classifier 204 can learn the behavior of actual spammers in the past, and use the learned behavior to identify numbers in the aggregated data that have the same or similar behavior as the actual spammers and are thus likely phone numbers of spam callers.

Classifier 204 can add the numbers associated with spam callers to a spammer database 206. A spammers list can then be created from the spammer database 206 and forwarded to a call blocker component 208 of the end user device 112. The call blocker 208 can be configured to block some or all of the numbers in the spammers list to prevent such calls from being completed on end user device 112. For example, call blocker 208 can be configured to reject the call, automatically forward the call to voice mail, or other actions that are designed to avoid disturbing the user of end user device 112.

Figure 3:
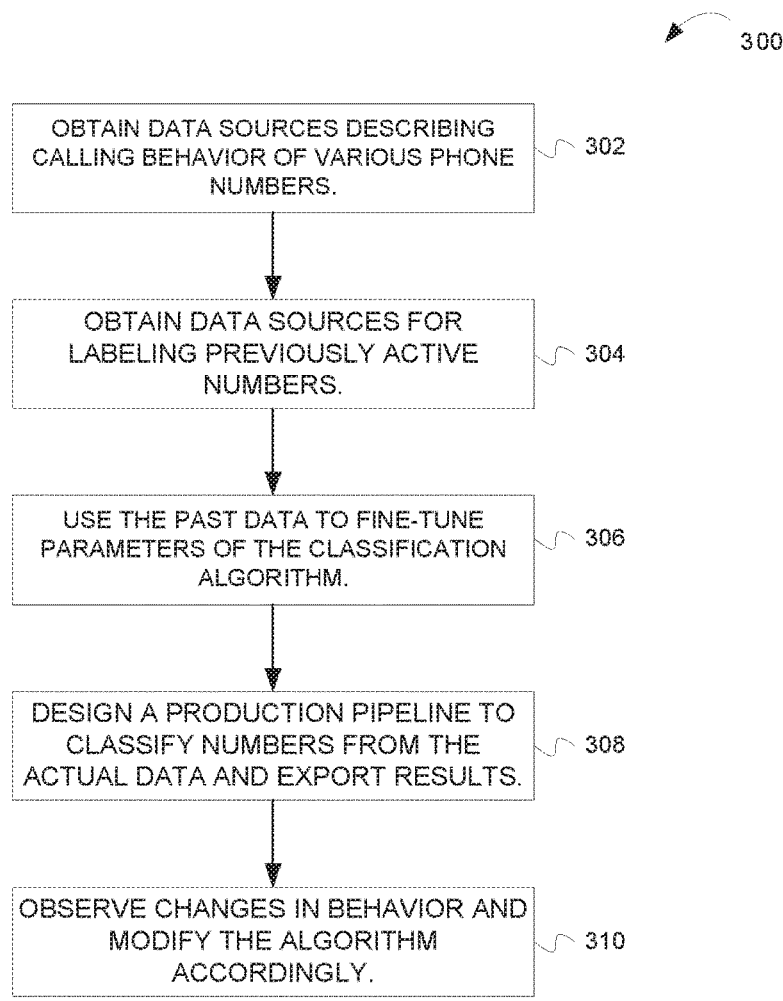
FIG. 3 is a flow chart describing a method for identifying spam callers according to embodiments.

FIG. 3 is a flowchart 300 describing a method for identifying potential spam callers according to embodiments. The method may, in some aspects, constitute computer programs made up of computer-executable instructions. Describing the method by reference to a flowchart enables one skilled in the art to develop such programs including such instructions to carry out the method on suitable processors (the processor or processors of the computer executing the instructions from computer-readable media). The method illustrated in FIG. 3 is inclusive of acts that may be taken by an operating environment 100 executing an example embodiment of the invention.

At block 302, a system executing the method obtains call log data from end user devices 112. As noted above, such data can include the duration of a call, a phone number of the originator of the call, and a time when the call was made.

At block 304, data can be obtained from sources that include data and metadata for previously active phone numbers. The data can include labels that identify numbers that have been determined to be associated with actual spam callers. As noted above, the data can be obtained from public sources such as the FCC, GOOGLE® maps etc. In some aspects, some end users may be asked for feedback or confirmation on selected numbers. The number can be selected based on the results of a machine learning algorithm that can classify phone numbers. For example, the machine learning algorithm may be able to identify particular phone numbers as most likely a spam caller or most likely not a spam caller. Numbers which cannot be classified within a predefined or configurable certainty factor as one or the other may be classified as "maybe a spam caller." Such numbers can be selected for further feedback gathering. A product owner can determine whether or not a user is ultimately contacted for feedback. For example, the system may restrict the number of times a user may be asked to provide feedback over a period of time. Further, the system can take user preferences into account when selecting users to provide feedback about a number.

At block 306, the data obtained at 304 can be utilized to determine parameters that indicate behavior associated with a spam caller. Existing parameters can be fine-tuned, and new parameters that are learned can be added to the classification algorithm. In some embodiments, feature selection is employed with respect to the parameters. The selected features can be used to indicate behavior associated with a spam caller. Further, a country-based feature selector can be employed such that a classifier 204 is run for each particular country of interest on the available data pertaining to the particular country to obtain a country-specific combination of algorithms. Thus, in the analytical engine 102, these country-specific algorithms can work in parallel and each of them can produce a spammer set specific for that country.

In some embodiments, two kinds of algorithms can be employed by the classifier 204, naïve classifiers (e.g., naïve Bayes classifier) and decision trees. A naive classifier is created once an analyst or analytical engine 102 observes a statistical correlation between a subset of spammers and a certain combination of parameters. For example, the phone numbers of delivery companies have very specific behavior (e.g., very short calls to many unique numbers) which could be mistakenly labelled as spammers. Thus, values for these parameters are determined that can differentiate between spammers and these delivery numbers. Similarly, a naive classifier can be utilized that detects support services (which tend to have a large number of long calls). Further, a naive classifier can be utilized that detects suspicious numbers for which it cannot be determined with sufficient confidence whether they are spammers or not. Such numbers can be provided to selected users, who are prompted to send feedback regarding the suspicious numbers. In this case, the parameters can include an indication of an increase in the number of phone calls made in recent days by the suspicious numbers.

In some embodiments, a decision tree can be constructed on an automated basis using machine learning algorithms applied against historical data (i.e., phone numbers with labels indicating whether a particular number is associated with a spammer or not). More weight can be given to parameters that are robust to biases stemming from the length of the data collection interval. For example, more weight can be given to "average calls per day" compared to "total calls made during the interval." Multiple decision trees can be constructed on a random sample of the data and ordered based on their F1-performance statistics, where the F1 performance statistics are a measure of accuracy. In some aspects, the decision trees having higher F1 performance can be investigated and measured as to how they work in concert with the naive classifiers discussed above. For example, the purpose of the naive classifier is typically to take care of specific cases, while the decision tree is typically used to identify spammers in general. The parameters that the decision tree chooses can vary with time. However, the inventors have determined that certain parameters such as average duration of incoming calls, unique ratio of incoming callers, success ratio of outgoing calls, maximum call duration, etc. can be particularly useful in identifying spam caller phone numbers. The unique ratio of incoming callers is a ratio of unique incoming phone numbers to total incoming phone numbers. For example, if a number has 100 incoming calls, all of which came from the same number, then the unique ratio would be 0.01. If the number has 100 incoming calls from 50 different numbers, the unique ratio would be 0.5. The success ratio is a ratio the total number of outgoing calls that have a duration greater than 0 (or other predetermined or configurable threshold) over the total number of outgoing calls.

At block 308, the parameters determined at block 306 can be used in a production pipeline that applies the parameters to the aggregated call log data collected at block 302 to determine current spam callers. The parameters discussed above can be used to identify a spammer in addition to factors such as operating system (e.g., ANDROID® or iOS®), geographical areas of the source of the incoming call the receiving device etc. A rapid spike in parameter values typically associated with spammers can be used to determine that the behavior associated with a phone number is the same as or similar to a spam caller. The identified spam callers can be exported to end user devices and used by a call blocker 208 on an end user device 112.

At block 310, the system can observe changes in behavior over time and modify the parameters or algorithm used to identify spam callers accordingly.

Some embodiments can provide advantages over previous systems. For example, some previous systems require active user cooperation in the form of crowd sourcing. For example, a system can gather votes from users, where the votes are used to determine if a number is a spammer number. However, it is difficult for such systems to detect a newly rising spammer phone number.

Further, some previous systems upload a user's contact list to a server. Various embodiments avoid this potential breach of privacy because various embodiments do not utilize a user's contact list.

Figure 4:
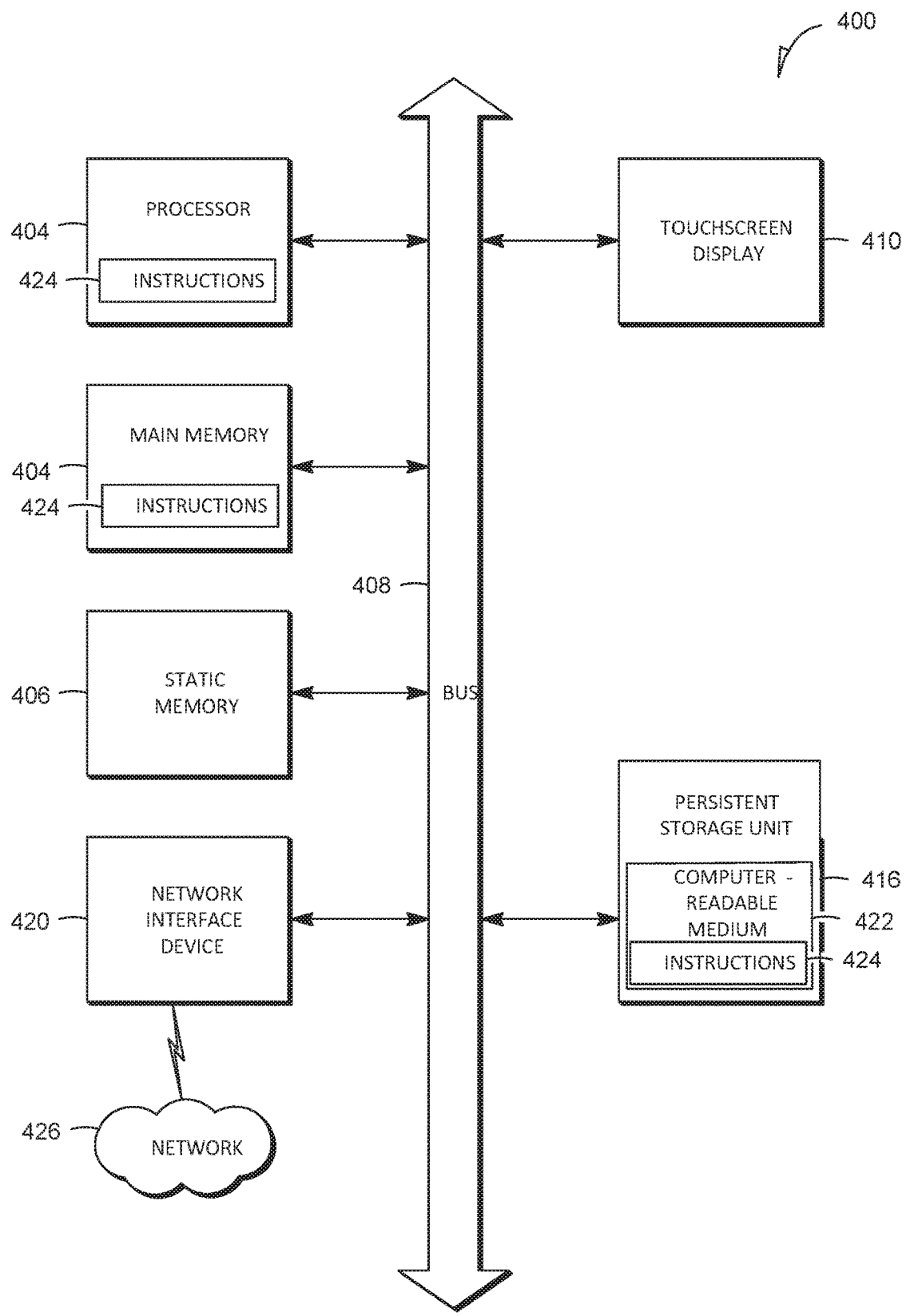
FIG. 4 is a block diagram of an example embodiment of a computer system upon which embodiments of the inventive subject matter can execute.

With reference to FIG. 4, an example embodiment extends to a machine in the example form of a computer system 400 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 400 may include a processor 402 (e.g., a central processing unit (CPU), a graphics processing unit (GPU) or both), a main memory 404 and a static memory 406, which communicate with each other via a bus 408. The computer system 400 may further include a touchscreen display unit 410. In example embodiments, the computer system 400 also includes a network interface device 420.

The persistent storage unit 416 includes a machine-readable medium 422 on which is stored one or more sets of instructions 424 and data structures (e.g., software instructions) embodying or used by any one or more of the methodologies or functions described herein. The instructions 424 may also reside, completely or at least partially, within the main memory 404 or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 424 may further be transmitted or received over a communications network 426 using a signal transmission medium via the network interface device 420 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WI-FI® and WIMAX® networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for identifying spam callers, the method comprising:
   receiving, by a classifier of an analytical engine from one or more data sources, first data associated with voice calls of previously identified spammer phone numbers;
   receiving second data associated with voice calls of phone numbers,
      wherein the second data includes phone numbers associated with the voice calls that are different from the previously identified spammer phone numbers;
   determining, by the classifier of the analytical engine applying one or more machine learning algorithms to the received first data, values for one or more parameters that each indicate a spam caller behavior
      wherein the one or more parameters include at least one member of the group consisting of
         a ratio of a number of unique incoming callers for a phone number in the second data to a total number of incoming callers for the same phone number, and
         a ratio of a number of outgoing calls from a phone number in the second data having a duration greater than a predetermined or configurable threshold to a total number of outgoing calls from the same phone number;
   identifying one or more phone numbers in the second data as associated with the spam caller behavior based on the one or more phone numbers having values for at least one of the one or more parameters determined to indicate spam caller behavior by the classifier of the analytical engine; and
   providing the identified one or more phone numbers to a call blocker of a telephone device.

2. The method of claim 1, wherein the one or more parameters further include a maximum call duration.

3. The method of claim 1, further comprising:
   in response to determining that a phone number in the second data cannot be classified, issuing a request to one or more end-user telephone devices for information regarding the phone number;
   in response to receiving one or more replies to the one or more requests, classifying the phone number in accordance with the one or more replies.

4. The method of claim 1, wherein the call blocker is configured to reject a call in response to determining a phone number associated with the call is included in the one or more phone numbers in the second data as associated with a spam caller.

5. The method of claim 1, further comprising anonymizing end-user phone numbers in the second data.

6. The method of claim 1, wherein receiving the second data associated with the phone numbers includes receiving call log data from a plurality of anti-malware components, wherein each anti-malware component comprises one of a plurality of end-user devices.

7. The method of claim 1, wherein determining, from the first data, one or more parameters for a classification engine includes performing feature selection on the first data, wherein the one or more parameters represent features associated with spam callers.

8. A non-transitory machine-readable medium having instructions stored thereon, that when executed, cause one or more processors to:
   receive, by a classifier of an analytical engine from one or more data sources, first data associated with voice calls of previously identified spammer phone numbers;

receive second data associated with voice calls of phone numbers,
  wherein the second data includes phone numbers associated with the voice calls that are different from the previously identified spammer phone numbers;
determine, by the classifier of the analytical engine applying one or more machine learning algorithms to the received first data, values for one or more parameters that indicate a spam caller behavior, wherein the one or more parameters include at least one member of the group consisting of,
  a ratio of a number of unique incoming callers for a phone number in the second data to a total number of incoming callers for the same phone number, and
  a ratio of a number of outgoing calls from a phone number in the second data having a duration greater than a predetermined or configurable threshold to a total number of outgoing calls from the same phone number;
identify one or more phone numbers in the second data as associated with the spam caller behavior based on the one or more phone numbers having values for at least one of the one or more parameters determined to indicate spam caller behavior by the classifier of the analytical engine; and
provide the identified one or more phone numbers to a call blocker of a telephone device.

9. The non-transitory machine-readable medium of claim 8, wherein the one or more parameters further include a maximum call duration.

10. The non-transitory machine-readable medium of claim 8, wherein the instructions further comprise instructions to cause the one or more processors to:
  in response to a determination by the one or more processors that a phone number in the second data cannot be classified, issue a request to one or more end-user telephone devices for information regarding the phone number;
  in response to receipt of one or more replies to the one or more requests, classify the phone number in accordance with the one or more replies.

11. The non-transitory machine-readable medium of claim 8, wherein the call blocker is configured to reject a call in response to determining a phone number associated with the call is included in the one or more phone numbers in the second data as associated with a spam caller.

12. The non-transitory machine-readable medium of claim 8, wherein the instructions to receive the second data associated with the phone numbers include instructions to receive call log data from a plurality of anti-malware components, wherein each anti-malware component comprises one of a plurality of end-user mobile devices.

13. The non-transitory machine-readable medium of claim 8, wherein determining, from the first data, one or more parameters for a classification engine includes performing feature selection on the first data, wherein the one or more parameters represent features associated with spam callers.

14. A system comprising:
  one or more processors;
  a network interface; and
  a non-transitory machine-readable medium having instructions stored thereon, that when executed, cause the one or more processors to:
    receive, by a classifier of an analytical engine from one or more data sources via the network interface, first data associated with voice calls of previously identified spammer phone numbers,
    receive second data associated with voice calls of phone numbers,
      wherein the second data includes phone numbers associated with the voice calls that are different from the previously identified spammer phone numbers,
    determine, by the classifier of the analytical engine applying one or more machine learning algorithms to the received first data, values for one or more parameters that each indicate a spam caller behavior,
      wherein the one or more parameters include at least one member of the group consisting of,
        a ratio of a number of unique incoming callers for a phone number in the second data to a total number of incoming callers for the same phone number, and
        a ratio of a number of outgoing calls from a phone number in the second data having a duration greater than a predetermined or configurable threshold to a total number of outgoing calls for the same phone number,
    identify one or more phone numbers in the second data as associated with the spam caller behavior based on the one or more phone numbers having values for at least one of the one or more parameters determined to indicate spam caller behavior by the classifier of the analytical engine, and
    provide the identified one or more phone numbers to a call blocker of a telephone device.

15. The system of claim 14, wherein the one or more parameters further include a maximum call duration.

16. The system of claim 14, wherein the instructions further comprise instructions to cause the one or more processors to:
  in response to a determination by the one or more processors that a phone number in the second data cannot be classified, issue a request to one or more end-user telephone devices for information regarding the phone number;
  in response to receipt of one or more replies to the one or more requests, classify the phone number in accordance with the one or more replies.

17. The system of claim 14, wherein the call blocker is configured to reject a call in response to determining a phone number associated with the call is included in the one or more phone numbers in the second data as associated with a spam caller.

18. The system of claim 14, wherein the instructions to receive the second data associated with the phone numbers include instructions to receive call log data from a plurality of anti-malware components, wherein each anti-malware component comprises one of a plurality of end-user mobile devices.

19. The system of claim 14, wherein determining, from the first data, one or more parameters for a classification engine includes performing feature selection on the first data, wherein the one or more parameters represent features associated with spam callers.

20. The system of claim 14, wherein the instructions further comprise instructions to cause the one or more processors to anonymize end-user phone numbers in the second data.

* * * * *